(12) United States Patent
Kuronuma et al.

(10) Patent No.: US 11,667,138 B2
(45) Date of Patent: Jun. 6, 2023

(54) PRINTING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Daigo Kuronuma, Kanagawa (JP); Toshiaki Yamaguchi, Tokyo (JP); Takuya Suto, Kanagawa (JP); Toshiro Sugiyama, Kanagawa (JP); Kouhei Tokuda, Tokyo (JP); Kenji Shimamura, Saitama (JP); Ryo Harigae, Tokyo (JP); Ryosuke Murata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 17/186,259

(22) Filed: Feb. 26, 2021

(65) Prior Publication Data

US 2021/0276349 A1 Sep. 9, 2021

(30) Foreign Application Priority Data

Mar. 5, 2020 (JP) .............................. JP2020-038123

(51) Int. Cl.
*B41J 13/00* (2006.01)
*G06K 15/16* (2006.01)

(52) U.S. Cl.
CPC .......... *B41J 13/0009* (2013.01); *G06K 15/16* (2013.01)

(58) Field of Classification Search
CPC .... B41J 11/0095; B41J 11/42; B41J 13/0009; B41J 11/006; B41J 29/38; B41J 11/0045; B41J 29/393; G06K 15/16
See application file for complete search history.

(56) References Cited

U.S. PATENT DOCUMENTS

| 8,292,291 B2 | 10/2012 | Amamoto |
| 2011/0069976 A1 | 3/2011 | Ozawa |
| 2019/0299675 A1* | 10/2019 | Hattori ................. B41J 11/0095 |

FOREIGN PATENT DOCUMENTS

| JP | 2011-065083 A | 3/2011 |
| JP | 2011-068423 A | 4/2011 |

(Continued)

OTHER PUBLICATIONS

U.S. Appl. No. 17/186,228, Takuya Suto Toshiro Sugiyama Ryosuke Murata Daigo Kuronuma Kenji Shimamura Ryo Harigae Toshiaki Yamaguchi Kouhei Tokuda, filed Feb. 26, 2021.

(Continued)

*Primary Examiner* — Jannelle M Lebron
(74) *Attorney, Agent, or Firm* — Venable LLP

(57) ABSTRACT

An apparatus includes a printing unit, a conveyance unit including first and second rotating members that nip and convey the sheet, and configured to hold the sheet by temporarily stopping the conveyance before completion of discharge of the sheet, a detection unit configured to detect a rotation of the first rotating member, a determination unit configured to determine whether the sheet has been pulled in a discharge direction based on a detection result of the detection unit in a case where the conveyance unit holds the sheet, and a control unit configured to, if the determination unit determines that the sheet has been pulled in the discharge direction, cause the conveyance unit to perform a discharging process of the sheet.

14 Claims, 12 Drawing Sheets

(56) References Cited

FOREIGN PATENT DOCUMENTS

| | | | |
|---|---|---|---|
| JP | 2012-234114 | A | 11/2012 |
| JP | 2018-114648 | A | 7/2018 |

OTHER PUBLICATIONS

U.S. Appl. No. 17/189,613, Ryosuke Murata Takuya Suto Toshiro Sugiyama Daigo Kuronuma Kenji Shimamura Ryo Harigae Toshiaki Yamaguchi Kouhei Tokuda, filed Mar. 2, 2021.

* cited by examiner

PRINTING APPARATUS, CONTROL METHOD, AND NON-TRANSITORY COMPUTER-READABLE STORAGE MEDIUM

BACKGROUND OF THE INVENTION

Field of the Invention

The present invention relates to a printing apparatus.

Description of the Related Art

As a printing apparatus, there is known an apparatus that performs printing on a sheet in the process from feeding to discharging of the sheet. Japanese Patent Laid-Open No. 2018-114648 discloses an apparatus that performs printing by discharging ink onto a sheet.

When a printed sheet is discharged, the sheet may fall from the printing apparatus and the printed surface may be damaged. As a measure to prevent a fall of the sheet, a method is conceivable in which the sheet is not completely discharged but nipped with a pair of rollers, and discharge of the sheet is completed in accordance with a user operation on an operation panel. However, in this method, the user is required to operate the operation panel while supporting the sheet to be discharged, and this imposes an overburden on the user.

SUMMARY OF THE INVENTION

The present invention provides a technique capable of discharging a sheet while preventing a fall of the sheet to be discharged and reducing the burden on a user.

According to an aspect of the present invention, there is provided a printing apparatus comprising: a printing unit configured to perform printing on a sheet; a conveyance unit including a first rotating member and a second rotating member that nip and convey the sheet, and configured to hold the sheet by temporarily stopping the conveyance before completion of discharge of the sheet; a detection unit configured to detect a rotation of the first rotating member, a determination unit configured to determine whether the sheet has been pulled in a discharge direction based on a detection result of the detection unit in a case where the conveyance unit holds the sheet; and a control unit configured to, if the determination unit determines that the sheet has been pulled in the discharge direction, cause the conveyance unit to perform a discharging process of the sheet.

Further features of the present invention will become apparent from the following description of exemplary embodiments (with reference to the attached drawings).

DESCRIPTION OF THE EMBODIMENTS

Figure 1:
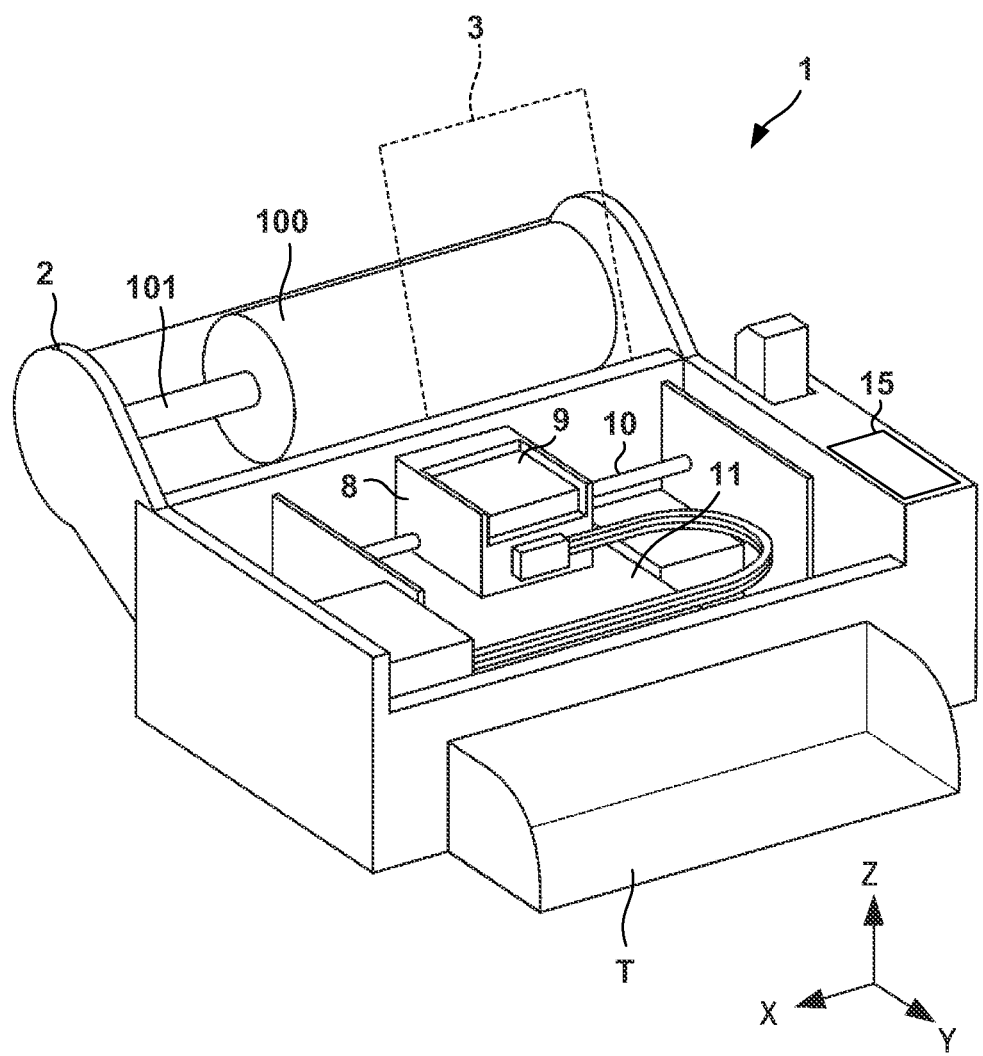
FIG. 1 is a schematic view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Outline of Printing Apparatus>

Figure 2:
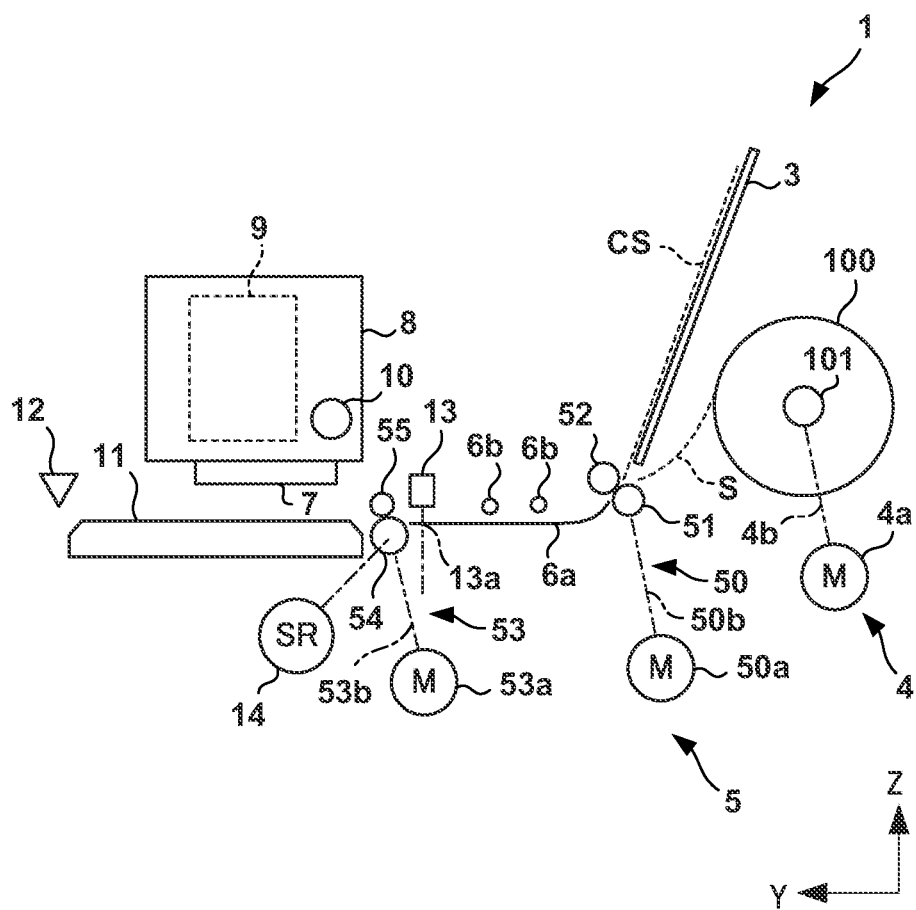
FIG. 2 is a view for explaining the internal arrangement of the printing apparatus shown in FIG. 1.

FIG. 1 is an external view of a printing apparatus 1 in this embodiment, and a perspective view showing a state in which the upper cover is removed. FIG. 2 is a schematic view showing the internal arrangement of the printing apparatus 1. In the drawings, X indicates the widthwise direction (left-and-right direction) of the printing apparatus 1, Y indicates the depth direction (front-and-rear direction) of the printing apparatus 1, and Z indicates the vertical direction. In this embodiment, a case will be described in which the present invention is applied to a serial inkjet printing apparatus that performs printing by scanning a carriage mounted with a printhead. However, the present invention is applicable to a printing apparatus of another form.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium" serving as a print target, sheet-like cloth, plastic film, and the like may be used as print media.

The printing apparatus 1 is an apparatus that can pull out a sheet S from a roll sheet 100 and print an image thereon. The sheet S is one continuous sheet, and the roll sheet 100 is obtained by winding the sheet S into a roll form around a cylindrical core. The roll sheet 100 particularly indicates a roll portion of the sheet S.

On the far side (rear side) of the printing apparatus 1, there is provided a roll support unit 2 that rotatably supports the roll sheet 100 with a spool shaft 101 as the center of rotation. A feeding tray 3, on which a cut sheet CS is stacked, can be selectably attached to the roll support unit 2. A user can perform printing on the cut sheet CS by attaching the feeding tray 3 to the roll support unit 2.

A discharge tray T is provided on the near side (front side) of the printing apparatus 1. The roll sheet 100 supported by the roll support unit 2 or the cut sheet CS stacked on the feeding tray 3 undergoes image printing in the process of being discharged to the discharge tray T.

An operation panel 15, which is used by the user to input various settings and commands and check information, is provided on the upper surface of the printing apparatus 1.

The printing apparatus 1 includes a drive unit 4 that rotates the roll sheet 100, and a conveyance unit 5 that conveys the sheet S or the cut sheet CS. The drive unit 4 includes a roll sheet motor 4a as a driving source, and a transmission mechanism 4b such as a gear mechanism that transmits the driving force of the roll sheet motor 4a to the spool gear of the spool shaft 101. By rotating the roll sheet motor 4a, the sheet S of the roll sheet 100 can be fed to the conveyance unit 5.

The conveyance unit 5 of the printing apparatus 1 comprises a feeding mechanism 50 on the upstream side in the conveyance direction, and a conveying mechanism 53 on the downstream side. The feeding mechanism 50 includes a feeding roller 51 and a separation roller 52. Each of the feeding roller 51 and the separation roller 52 is a rotating member provided rotatably around the X-direction axis. The separation roller 52 is pressed against the feeding roller 51 and rotates following the rotation of the feeding roller 51. The separation roller 52 does not rotate following the rotation of the feeding roller 51 unless a certain load is applied. Thus, double feed of the cut sheets CS is prevented.

The feeding mechanism 50 includes a feeding motor 50a as a driving source, and a transmission mechanism 50b such as a gear mechanism that transmits the driving force of the feeding motor 50a to the feeding roller 51. By driving the feeding motor 50a, the feeding roller 51 is rotated, and the sheet S fed from the roll sheet 100 or the cut sheet CS on the feeding tray 3 is nipped between the feeding roller 51 and the separation roller 52 and conveyed to the downstream side.

The conveying mechanism 53 includes a conveying roller 54 and a pinch roller 55. Each of the conveying roller 54 and the pinch roller 55 is a rotating member provided rotatably around the X-direction axis. The pinch roller 55 is pressed against the conveying roller 54 and rotates following the rotation of the conveying roller 54. The conveying roller 54 and the pinch roller 55 are located on the upstream side of the printing position of a printhead 7 in the conveyance direction (Y direction).

The conveying mechanism 53 includes a conveyance motor 53a as a driving source, and a transmission mechanism 53b such as a gear mechanism that transmits the driving force of the conveyance motor 53a to the conveying roller 54. By driving the conveyance motor 53a, the conveying roller 54 is rotated, and the sheet S or the cut sheet CS is nipped between the conveying roller 54 and the pinch roller 55 and conveyed onto a platen 11. The rotation amount of the conveying roller 54 is detected by a sensor 14. Based on the detection result of the sensor 14, the conveyance amount of the sheet S or the cut sheet CS can be specified, and the conveyed position of the sheet S or the cut sheet CS can be specified. The sensor 14 is, for example, a rotary encoder.

A lower guide member 6a and upper guide rollers 6b are provided between the feeding roller 51 and the conveying roller 54, and they define the conveyance path of the sheet S or the cut sheet CS. A sensor 13 is a sensor that detects the leading end or trailing end of the sheet S or the cut sheet CS in the conveyance direction, and a detection position 13a is set between the conveying roller 54 and the feeding roller 51.

The sensor 13 is a sensor whose output changes before and after the end of the sheet S or the cut sheet CS passes the detection position 13a. For example, an optical sensor, a reflection PI sensor, a flag-type PI sensor, or the like can be used as the sensor 13. The optical sensor includes, for example, a light emitting element and a light receiving element. The light emitting element emits light to the sheet S or the cut sheet CS, and the light receiving element receives the reflected light. The detection position 13a is set on the upstream side of a nip portion between the conveying roller 54 and the pinch roller 55 and adjacent to the nip portion.

The platen 11 supports the sheet S or the cut sheet CS from below, and guarantees a gap between the printhead 7 and the sheet S or the cut sheet CS. The printhead 7 is mounted on a carriage 8 and arranged to face the platen 11. The carriage 8 is supported such that it can be reciprocated in the X direction (main scanning direction) along a carriage shaft 10 serving as a scanning guide extending in the X direction. The carriage 8 is reciprocated by a driving mechanism which uses a carriage motor 16 (FIG. 3) as a driving source.

The printhead 7 is provided with discharge ports (nozzles) that discharge ink. The ink is supplied to the printhead 7 from an ink reservoir 9 mounted on the carriage 8. While the carriage 8 is moved, the ink is discharged from the printhead 7 onto the sheet S or the cut sheet CS. With a discharge operation of the printhead 7 and one scanning of the carriage 8, an image for one line can be printed. By alternately repeating such image printing and intermittent conveyance of the sheet S or the cut sheet CS by the conveying roller 54 in the Y direction (subscanning direction), an image for one page can be printing on the sheet S or the cut sheet CS.

A cutter 12 is arranged on the downstream side of the printhead 7 and the platen 11 in the Y direction. The cutter 12 cuts the sheet S in the X direction. Thus, a cut sheet with an image printed thereon can be obtained from the roll sheet 100.

<Control Device>

Figure 3:
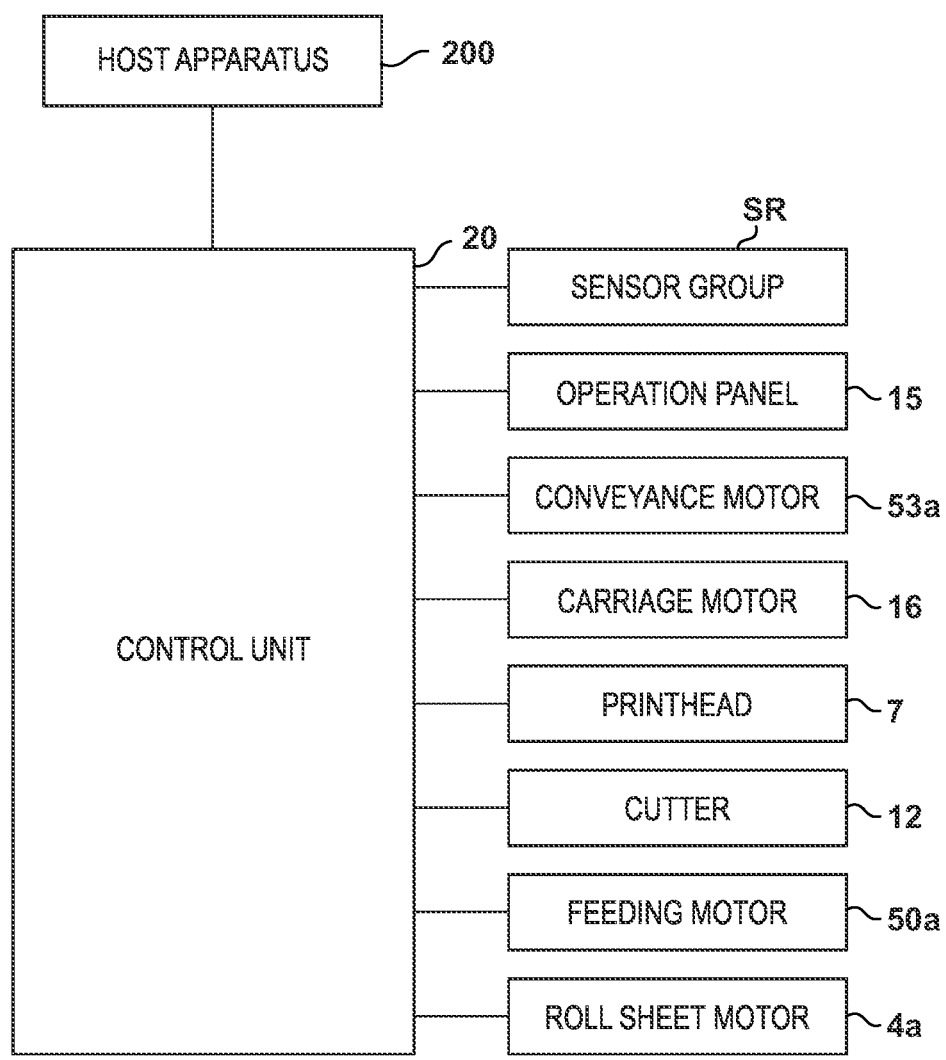
FIG. 3 is a block diagram of a control unit of the printing apparatus shown in FIG. 1.

With reference to FIG. 3, a control unit 20 of the printing apparatus 1 will be described. The control unit 20 receives image data and a print instruction thereof from a host apparatus 200, and performs a printing operation. The control unit 20 includes a processing unit, a storage unit, and an interface unit, and controls the entire printing apparatus 1. The processing unit is a processor represented by a CPU, and executes programs stored in the storage unit. The storage unit is a storage device such as a RAM or a ROM, and stores programs and data.

The control unit 20 performs display control of the operation panel 15, detection of an input operation on the operation panel 15, and a reception process of the input operation. Further, the control unit 20 controls, based on detection results of a sensor group SR, the conveyance motor 53a, the carriage motor 16, the printhead 7, the cutter 12, the feeding motor 50a, the roll sheet motor 4a, and the like. The sensor group SR includes the sensor 13 and the sensor 14.

<Control Example>

Figure 4A:
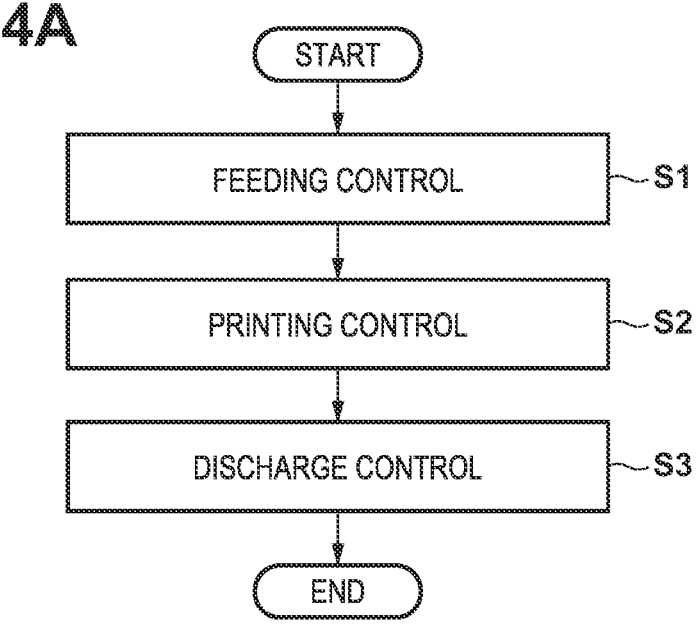
FIGS. 4A and 4B are flowcharts showing a process example of the control unit.
Figure 5A:
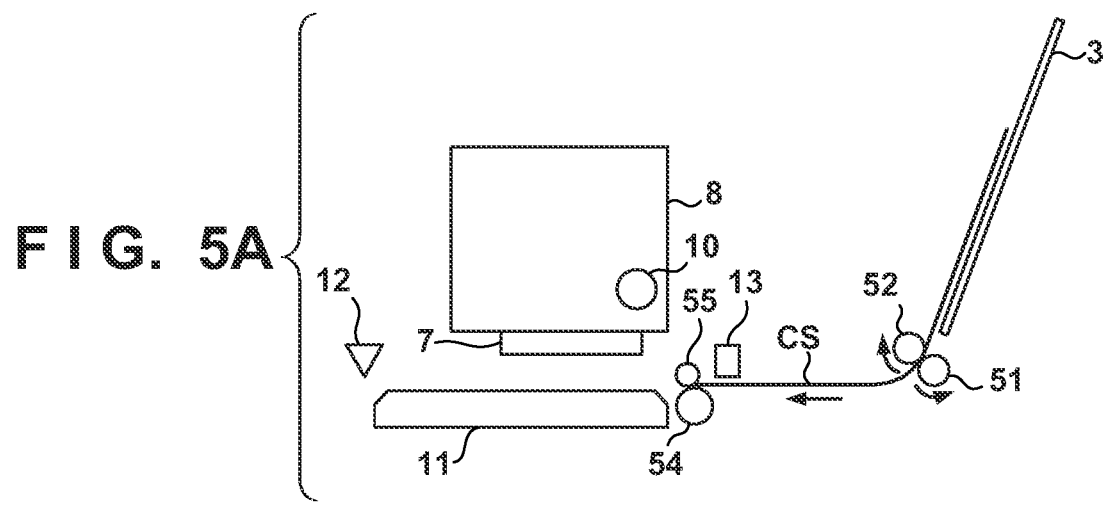
FIGS. 5A to 5C are views for explaining the operation of the printing apparatus shown in FIG. 1.
Figure 5B:
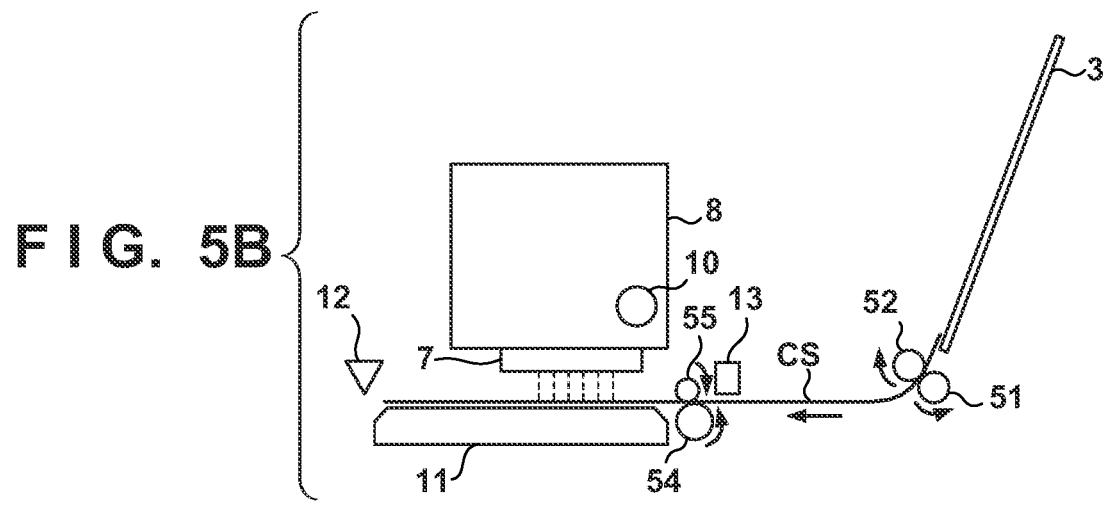
Figure 5C:
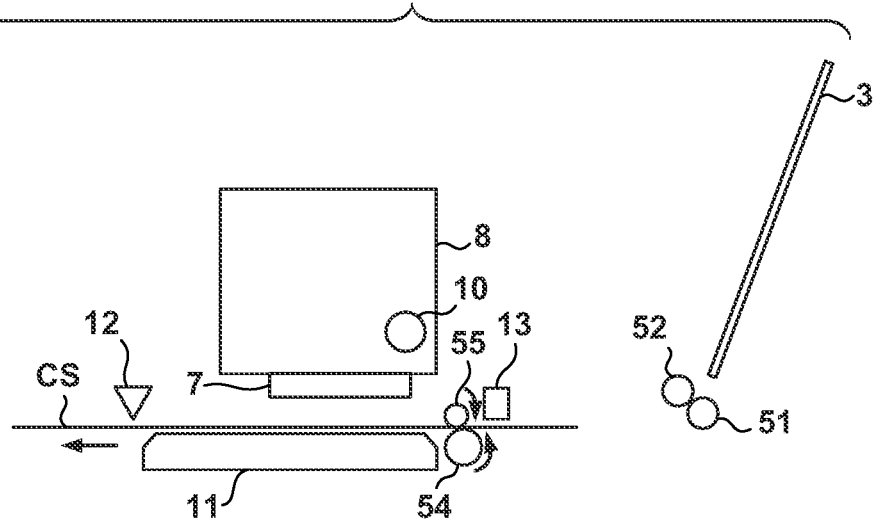

An example of control of the printing apparatus 1 by the control unit 20 will be described. A series of control operations related to image printing on the cut sheet CS will be described here. FIG. 4A is a flowchart showing an example of control by the control unit 20. FIGS. 5A to 5C are views for explaining the operation of the printing apparatus 1.

If a print start instruction is received from the host apparatus 200, feeding control is performed in step S1. Here, as shown in FIG. 5A, the feeding roller 51 is rotated to feed the cut sheet CS on the feeding tray 3 to the inside of the apparatus. When the cut sheet CS is conveyed by a predetermined amount after the leading end of the cut sheet CS has been detected by the sensor 13, the leading end abuts against the nip portion between the conveying roller 54 and the pinch roller 55.

Next, printing control is performed in step S2 of FIG. 4A. Here, the conveying roller 54 is rotated to convey the cut sheet CS onto the platen 11. Then, as shown in FIG. 5B, by alternately repeating printing of an image for one line by the ink discharge operation of the printhead 7 and the carriage moving operation, and intermittent conveyance of the cut sheet CS by rotation of the conveying roller 54, the image is printed on the cut sheet CS.

When the image printing is completed, discharge control is performed in step S3 of FIG. 4A. Here, as shown in FIG. 5C, an operation is performed in which the conveying roller 54 is rotated to discharge the printed cut sheet CS onto the discharge tray T.

<Discharge Control>

The discharge control in step S3 of FIG. 4A will be described in detail. When the cut sheet CS is discharged, the cut sheet CS may fall on the discharge tray T or fall outside from the discharge tray T. If the cut sheet CS is a sheet such as glossy paper that is easily damaged, the cut sheet CS may be damaged due to a fall of the cut sheet CS.

Therefore, in this embodiment, the conveyance by the conveyance unit 5 is temporarily stopped before completion of discharge of the cut sheet CS, and the cut sheet CS is held in the nip portion between the conveying roller 54 and the pinch roller 55. Then, it is detected whether the user has pulled the cut sheet CS, and if the pull operation is detected, the discharge is completed. Thus, the user can instruct to complete the discharge in a state in which he/she is holding the cut sheet CS. Therefore, it is possible to provide a technique capable of discharging a sheet while preventing a fall of the sheet to be discharged and reducing the burden on a user.

Figure 4B:
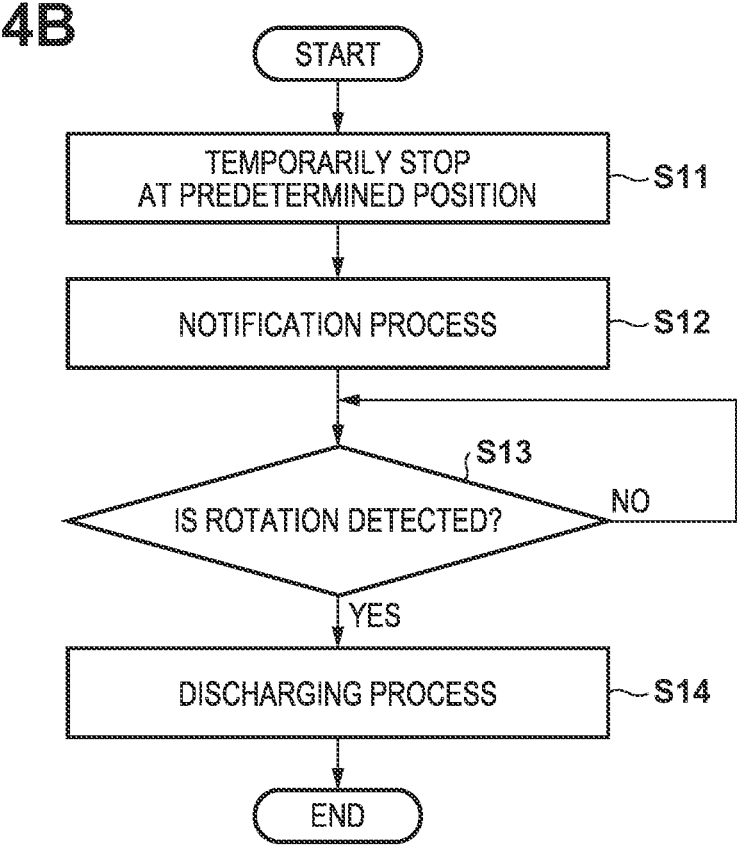
Figure 6A:
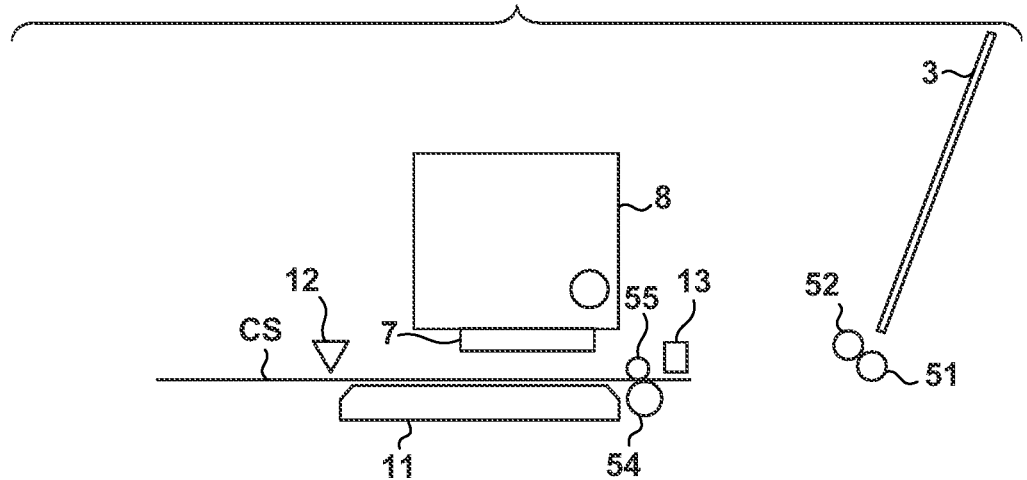
FIGS. 6A to 6C are views for explaining the operation of the printing apparatus shown in FIG. 1.
Figure 6B:
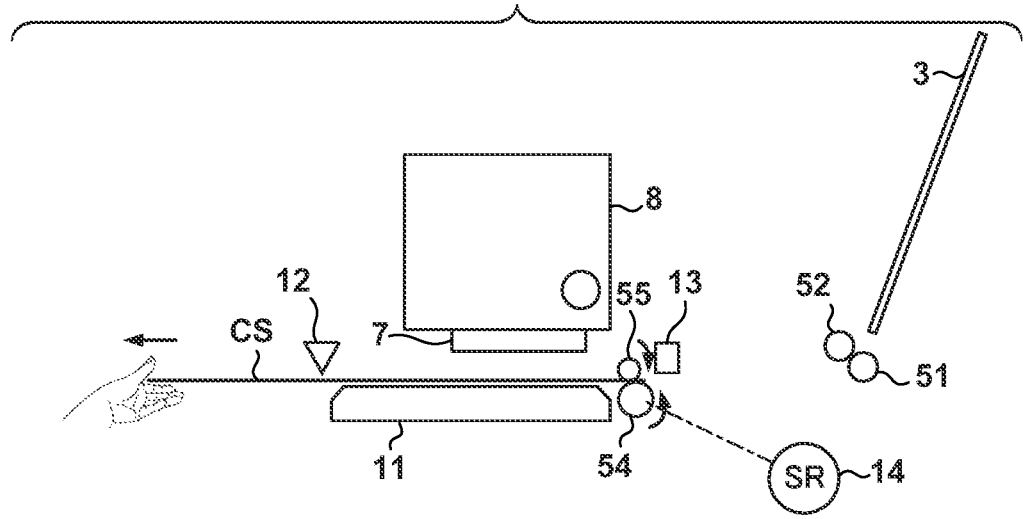
Figure 6C:
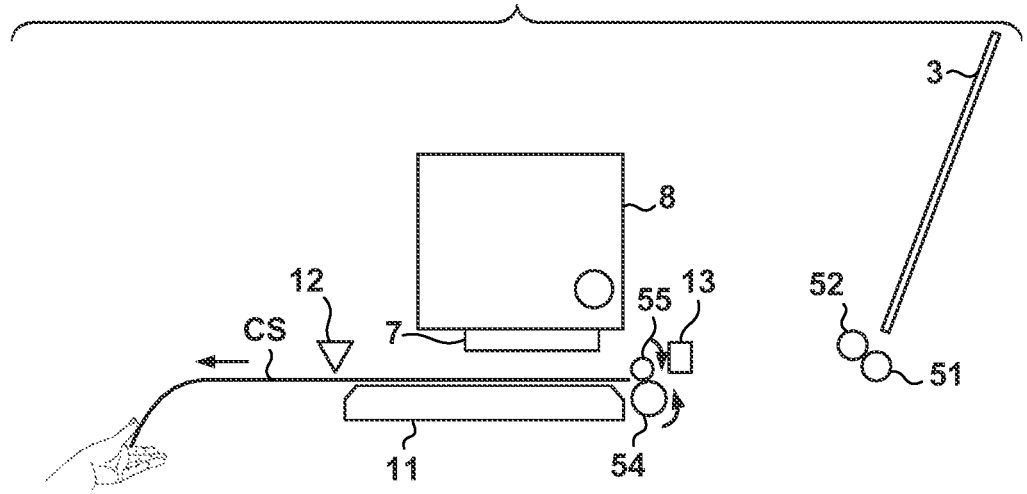

FIG. 4B is a flowchart showing the contents of the discharge control in step S3, and FIGS. 6A to 6C are views for explaining the operation of the printing apparatus 1. In step S11 of FIG. 4B, stop control is performed in which the printed cut sheet CS is conveyed to a predetermined position and driving of the conveyance motor 53a is stopped to temporarily stop the conveyance. FIG. 6A shows a state in which the conveyance of the cut sheet CS is temporarily stopped. The cut sheet CS is stopped at a position where the trailing end thereof is located on the upstream side of the nip portion between the conveying roller 54 and the pinch roller 55 in the conveyance direction, so that the cut sheet CS is held by the nip portion between the conveying roller 54 and the pinch roller 55. Thus, a fall of the cut sheet CS can be prevented.

In step S12 of FIG. 4B, notification is performed to guide the user to pull the cut sheet CS in the discharge direction. The notification is performed by, for example, guide display on the operation panel 15 or an audio output. In a case of guide display, for example, a message such as "pull the sheet to complete the discharge" is displayed.

In step S13 of FIG. 4B, it is determined, based on the detection result of the sensor 14, whether the cut sheet CS has been pulled by the user in the discharge direction. More specifically, it is determined whether the conveying roller 54 has rotated. If it is determined that the conveying roller 54 has rotated, the process advances to step S14; otherwise, the determination in step S13 is repeated. FIG. 6B shows a state in which the user pulls the cut sheet CS. Since the cut sheet CS is nipped by the nip portion between the conveying roller 54 and the pinch roller 55, if the cut sheet CS is pulled, the conveying roller 54 rotates in the discharge direction. If this rotation is detected by monitoring the detection result of the sensor 14, it can be determined that the user has pulled the cut sheet CS.

In step S14 of FIG. 4B, a discharging process is performed. This discharging process is a discharge completion process of completing the discharge of the cut sheet CS. In this embodiment, driving of the conveyance motor 53a is restarted and, as shown in FIG. 6C, the cut sheet CS is conveyed to the downstream side by the rotation of the conveying roller 54. Thus, the discharge control is completed. Since the cut sheet CS is held by the user, a fall thereof can be avoided.

Second Embodiment

In the first embodiment, the detection result of the sensor 14 is monitored to determine whether the user has pulled the cut sheet CS in the discharge direction. However, instead of this, the determination may be made by monitoring the detection result of the sensor 13. That is, if the user pulls the cut sheet CS in the discharge direction, the trailing end of the cut sheet CS passes the detection position 13a of the sensor 13. Based on this passage, the discharge completion process is performed.

Figure 7:
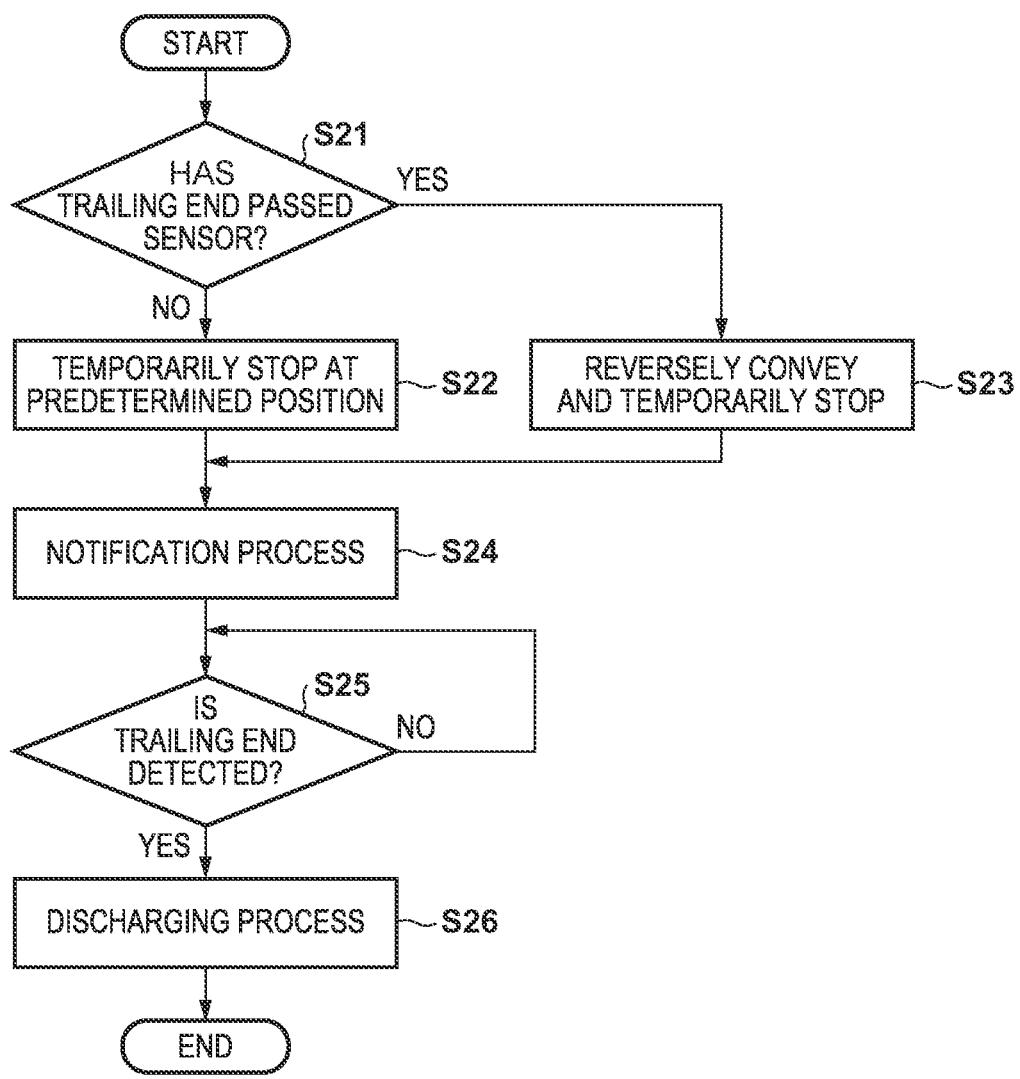
FIG. 7 is a flowchart showing another process example of the control unit.

FIG. 7 is a flowchart showing a process example of discharge control in this embodiment. This process is a process alternative to the process shown in FIG. 4B. FIGS. 8A to 8C and FIGS. 9A and 9B are views each for explaining the operation of a printing apparatus 1 in this embodiment.

In step S21 of FIG. 7, it is determined whether the trailing end of a printed cut sheet CS has passed a detection position 13a of a sensor 13. The position of the trailing end of the cut sheet CS at the time of completion of printing differs depending on the margin amount on the trailing end side of the cut sheet CS. In step S21, this is determined. If the trailing end of the cut sheet CS has not passed the detection position 13a, the process advances to step S22; otherwise, the process advances to step S23.

Figure 8A:
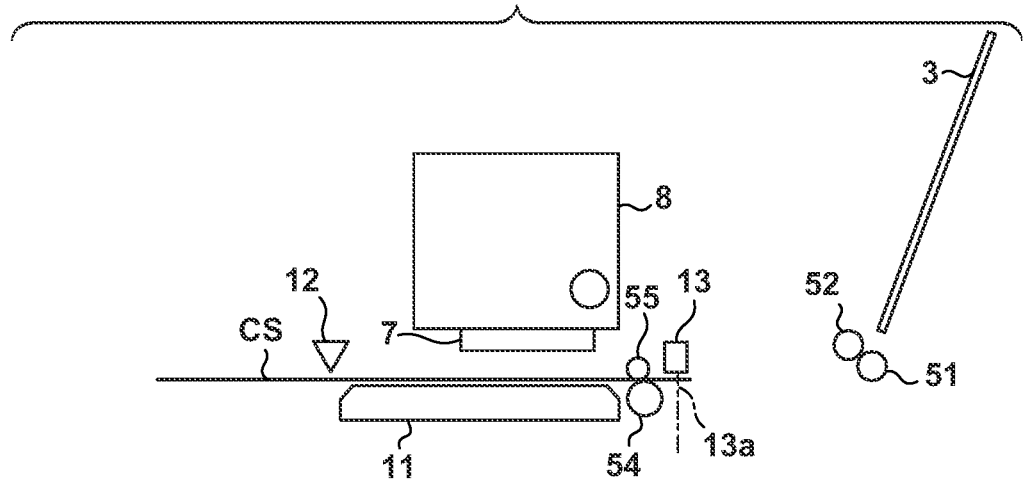
FIGS. 8A to 8C are views for explaining another operation.

In step S22, the cut sheet CS is conveyed to a predetermined position, and driving of a conveyance motor 53a is stopped to temporarily stop the conveyance. FIG. 8A shows a state in which the conveyance of the cut sheet CS is temporarily stopped. The cut sheet CS is stopped at a position where the trailing end thereof is located on the upstream side of the detection position 13a of the sensor 13 in the conveyance direction, so that the cut sheet CS is held by the nip portion between a conveying roller 54 and a pinch roller 55. Thus, a fall of the cut sheet CS can be prevented.

Figure 9A:
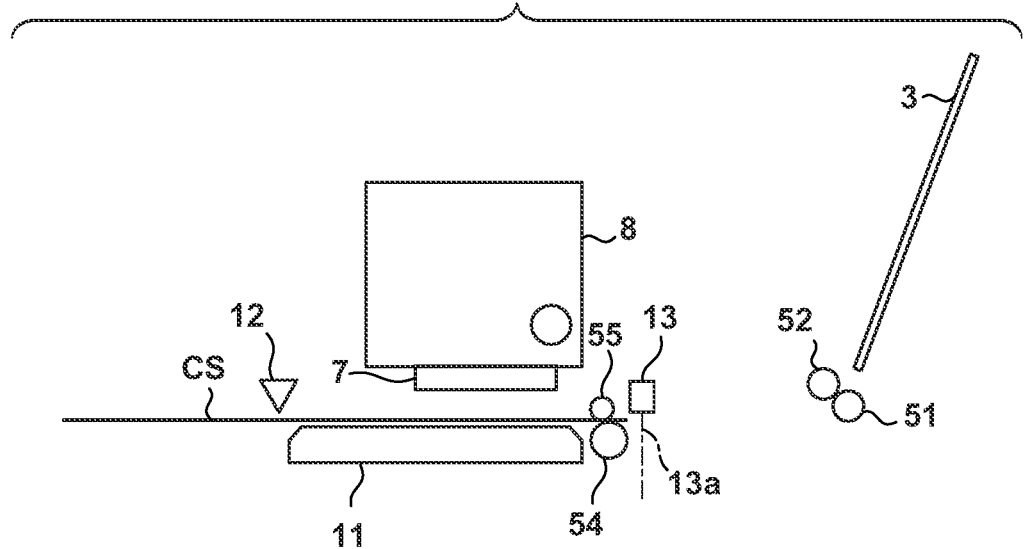
FIGS. 9A and 9B are views for explaining still another operation.
Figure 9B:
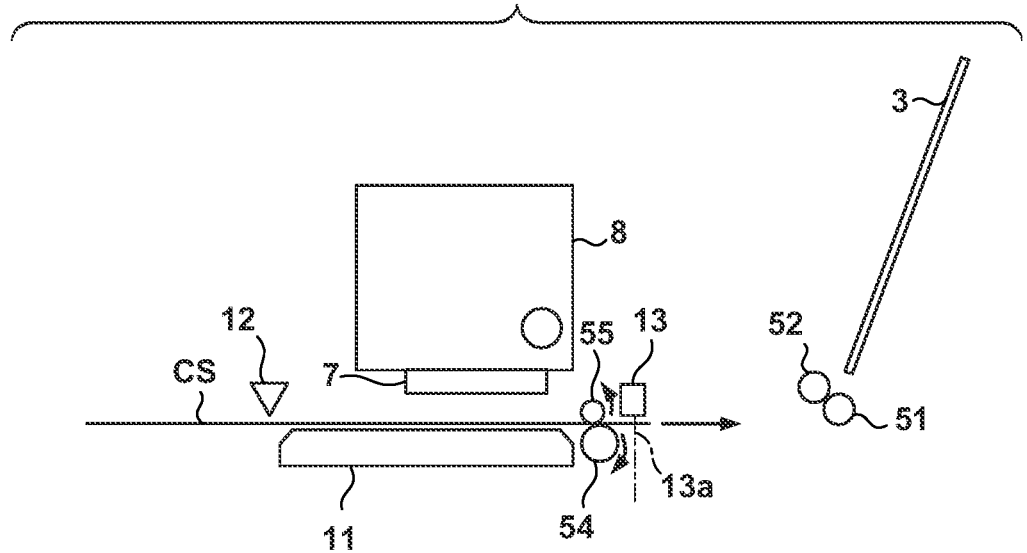

In step S23 of FIG. 7, the cut sheet CS is reversely conveyed to the upstream side such that the trailing end of the cut sheet CS is located on the upstream side of the detection position 13a. FIGS. 9A and 9B show an example of this operation. FIG. 9A shows an example of the position of the cut sheet CS at the time of completion of printing, and shows an example in which the trailing end of the cut sheet CS has passed the detection position 13a of the sensor 13. In this state, even if the user pulls the cut sheet CS, the sensor 13 cannot detect it. Therefore, as shown in FIG. 9B, the motor 53a is reversely driven to reversely rotate the conveying roller 54 to return the cut sheet CS to the upstream side. With this operation, the trailing end of the cut sheet CS can be located on the upstream side of the detection position 13*a* of the sensor 13.

Figure 8B:
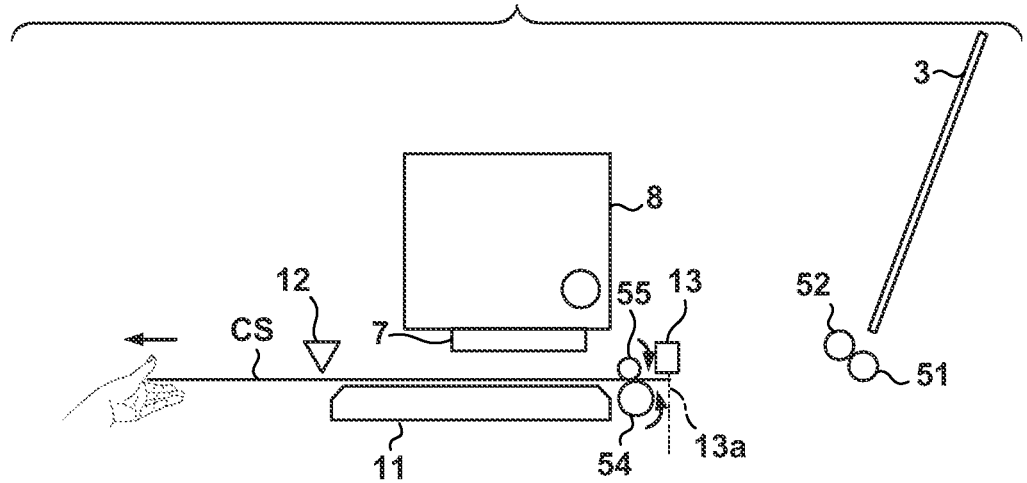

A notification process is performed in step S24 of FIG. 7. This is a process similar to that in step S12 of FIG. 4B. In step S25, it is determined, based on the detection result of the sensor 13, whether the cut sheet CS has been pulled by the user in the discharge direction. More specifically, it is determined whether the sensor 13 detects the passage of the trailing end of the cut sheet CS. If it is determined that the trailing end has passed, the process advances to step S26; otherwise, the determination in step S25 is repeated. FIG. 8B shows a state in which the user pulls the cut sheet CS. If the cut sheet CS moves in the discharge direction, the trailing end thereof passes the detection position 13*a* of the sensor 13, and this is indicated by the detection result of the sensor 13. If this passage is detected by monitoring the detection result of the sensor 13, it can be determined that the user has pulled the cut sheet CS.

Figure 8C:
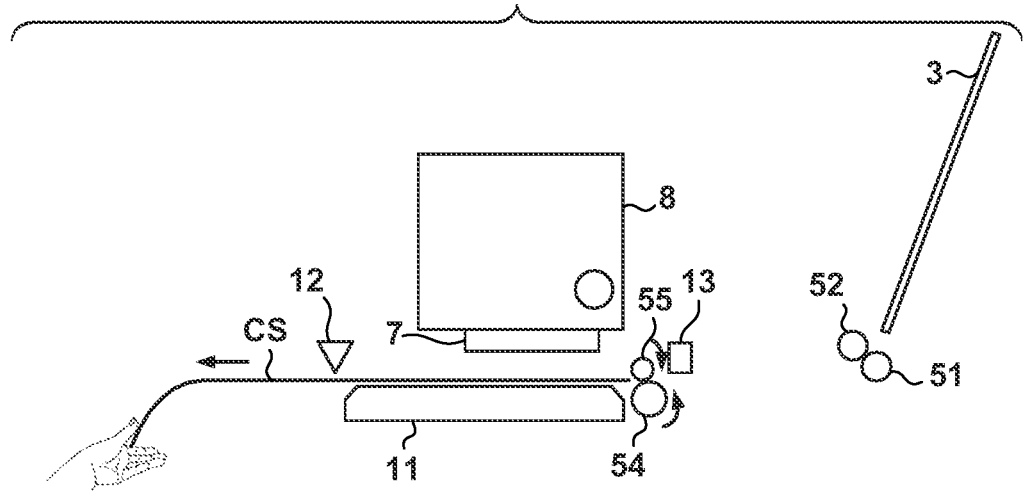

In step S26 of FIG. 7, a discharging process is performed. This is a process similar to that in step S14 of FIG. 4B. In this embodiment, driving of the conveyance motor 53*a* is restarted and, as shown in FIG. 8C, the cut sheet CS is conveyed to the downstream side by the rotation of the conveying roller 54. Thus, the discharge control is completed. Since the cut sheet CS is held by the user, a fall thereof can be avoided.

Third Embodiment

In either of the discharging process (step S14) in the first embodiment and the discharging process (step S26) in the second embodiment, driving of the conveyance motor 53*a* is restarted and the cut sheet CS is conveyed to the downstream side by the rotation of the conveying roller 54. However, the discharging process may be performed by simply releasing hold of the cut sheet CS by the nip portion between the conveying roller 54 and the pinch roller 55.

Figure 10A:
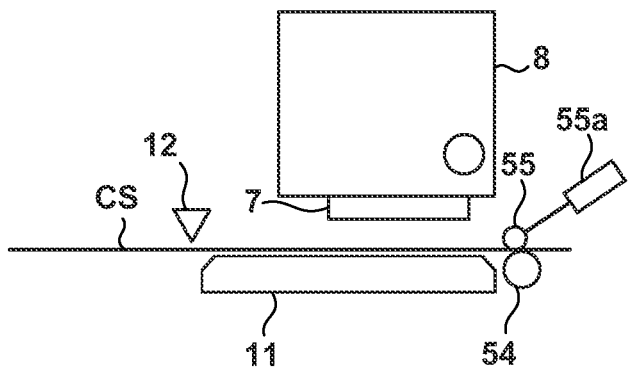
FIGS. 10A to 10C are views for explaining still another operation.

FIG. 10A is a view partially showing the internal arrangement of a printing apparatus 1 in this embodiment. In the example shown in FIG. 10A, a pinch roller 55 is provided such that it can be brought into contact with and separated from a conveying roller 54 by an actuator 55*a*. The actuator 55*a* is, for example, a pull solenoid. While the actuator 55*a* is not driven, the pinch roller 55 is pressed against the conveying roller 54 by being biased by an elastic member such as a return spring. While the actuator 55*a* is driven, the pinch roller 55 is displaced and separated from the conveying roller 54. The pinch roller 55 is normally pressed against the conveying roller 54.

Figure 10B:
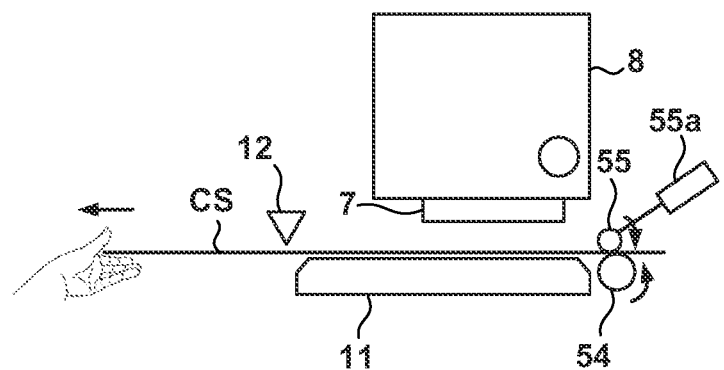
Figure 10C:
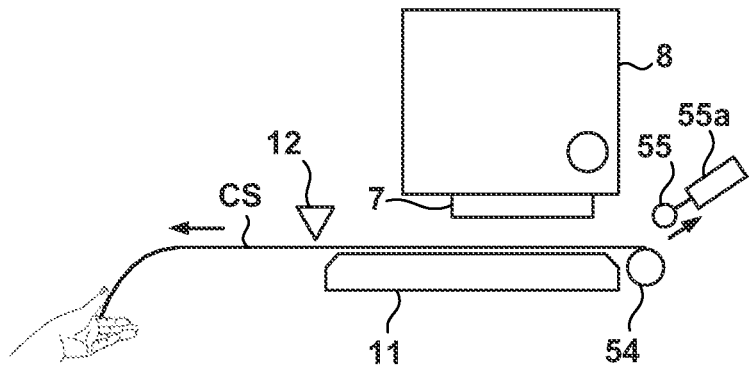

FIGS. 10B and 10C show an operation example in a case in which it is determined that a user has pulled a cut sheet CS in the discharge direction in this embodiment. In the stage shown in FIG. 10B, it is determined that the user has pulled the cut sheet CS in the discharge direction. FIG. 10C shows a state in which, as a discharge completion process, the actuator 55*a* is driven and the pinch roller 55 is separated from the conveying roller 54. The user can simply pull out the cut sheet CS, and the discharge control is completed.

Fourth Embodiment

Figure 11A:
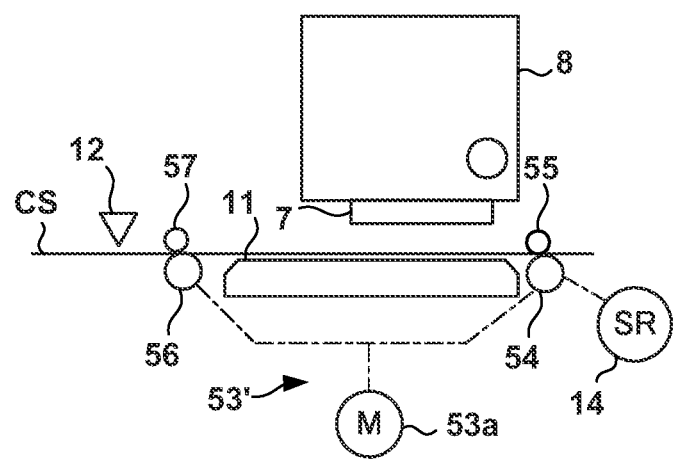
FIGS. 11A to 11C are views for explaining still another operation.

The conveyance unit 5 may include a discharging roller and hold the cut sheet CS with the discharging roller in the discharge control. FIG. 11A is a view partially showing the internal arrangement of a printing apparatus 1 in this embodiment.

A conveyance unit 5 includes a discharging roller 56 and a pressing spur 57. Each of the discharging roller 56 and the pressing spur 57 is a rotating member provided rotatably around the X-direction axis. The pressing spur 57 is pressed against the discharging roller 56 and rotates following the rotation of the discharging roller 56. The discharging roller 56 and the pressing spur 57 are located on the downstream side of the printing position of a printhead 7 and on the upstream side of a cutter 12 in the conveyance direction (Y direction).

The discharging roller 56 shares the driving source of a conveying mechanism 53 to use a conveying motor 53*a* as the driving source, but it may include its own driving source. A transmission mechanism 53' which replaces the transmission mechanism 53*b*, transmits the driving force of the conveyance motor 53*a* to a conveying roller 54 and the discharging roller 56. The conveying roller 54 and the discharging roller 56 rotate synchronously.

Figure 11B:
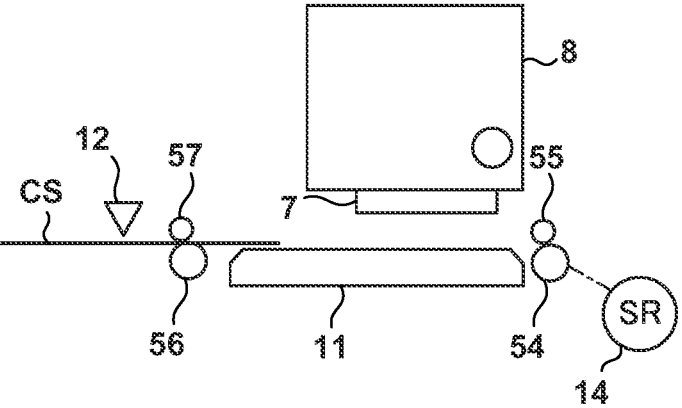
Figure 11C:
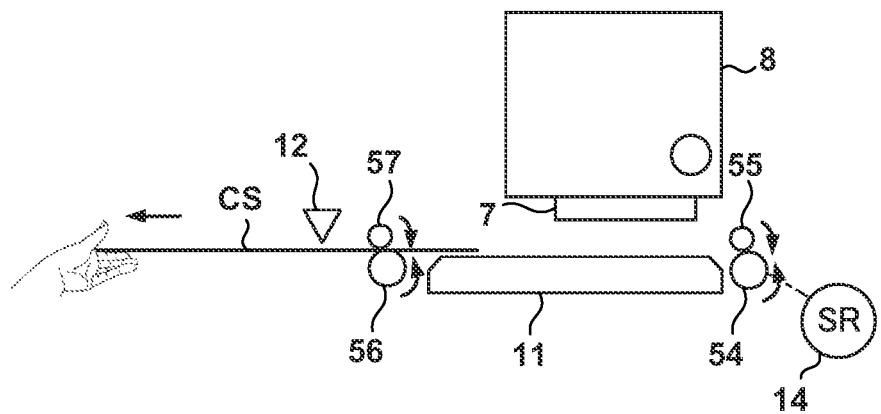

FIG. 11B shows a state in which a cut sheet CS is held by a nip portion between the discharging roller 56 and the pressing spur 57 in discharge control. FIG. 11C shows an operation example in a case in which it is determined that the user has pulled the cut sheet CS in the discharge direction in this embodiment. In the stage shown in FIG. 11C, as in the first embodiment, it is determined, based on the detection result of a sensor 14, that the user has pulled the cut sheet CS in the discharge direction. Thereafter, the conveyance motor 53*a* is driven to convey the cut sheet CS, and the discharge can be completed.

In this example, it is determined, based on the detection result of the sensor 14 that detects the rotation amount of the conveying roller 54, whether the user has pulled the cut sheet CS in the discharge direction. However, a sensor that detects the rotation amount of the discharging roller 56 may be provided, and the determination may be made based on the detection result of this sensor.

Figure 12A:
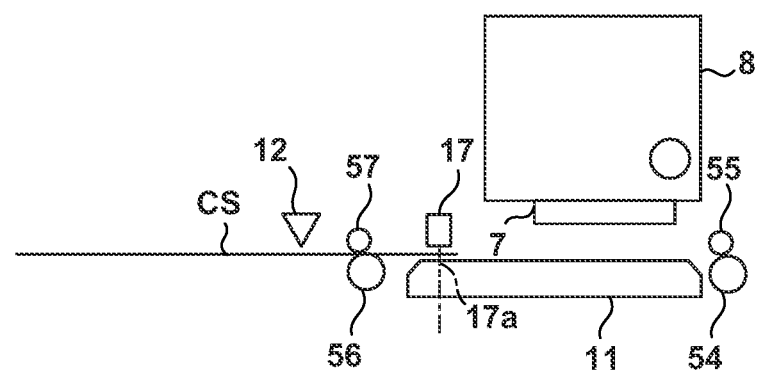
FIGS. 12A and 12B are views for explaining still another operation.
Figure 12B:
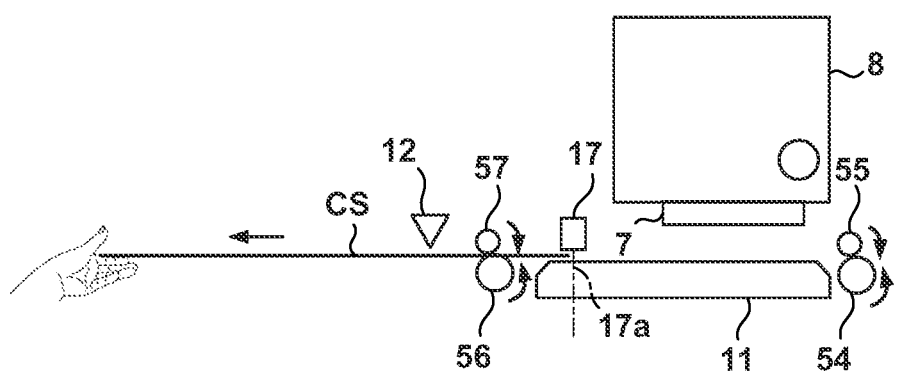

This embodiment can be combined with the second or third embodiment. When combined with the second embodiment, a sensor corresponding to the sensor 13 may be provided on the upstream side of the discharging roller 56. A sensor 17 having a detection position 17*a* in FIGS. 12A and 12B is an example of such a sensor. When combined with the third embodiment, the pressing spur 57 may be arranged such that it can be displaced by an actuator.

Fifth Embodiment

In each of the first to fourth embodiments, the cut sheet CS is used as the target, but it is also possible to use a sheet S of a roll sheet 100 as the target. The sheet S is required to be cut by a cutter 12. In this case, after it is determined that the user has pulled the sheet S in the discharge direction, the sheet S may be conveyed by a predetermined amount so as to be aligned with a cutting position, and the cutter 12 may cut the sheet S. Alternatively, in an arrangement in which the sheet S is held by a discharging roller 56 and a pressing spur 57 as in FIGS. 11A to 11C, the discharging roller 56 and the pressing spur 57 are arranged on the downstream side of the cutter 12. Then, in a state in which the sheet S has been cut by the cutter 12, the sheet S may be held by the discharging roller 56 and the pressing spur 57.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-038123, filed Mar. 5, 2020, which is hereby incorporated by reference herein in its entirety.

What is claimed is:

1. A printing apparatus comprising:
a printing unit configured to perform printing on a sheet;
a conveyance unit including a first rotating member and a second rotating member that nip and convey the sheet in a first direction, and configured to hold the sheet, after completion of printing by the printing unit, by temporarily stopping the conveyance before completion of discharge of the sheet;
a detection unit configured to detect a rotation of the first rotating member; and
a control unit configured to, in a case in which the detection unit detects rotation of the first rotating member in a state in which the sheet is held by the conveyance unit, cause the conveyance unit to perform a discharging process of the sheet.

2. The apparatus according to claim 1, further comprising a sheet detection unit configured to detect an end of the sheet with respect to the first direction,
wherein the conveyance unit temporarily stops the conveyance of the sheet before a trailing end of the sheet passes a detection position of the sheet detection unit.

3. The apparatus according to claim 1, further comprising a sheet detection unit configured to detect an end of the sheet with respect to the first direction,
wherein if in a case in which the conveyance of the sheet is temporarily stopped after a trailing end of the sheet has passed a detection position of the sheet detection unit, the conveyance unit conveys the sheet in a second direction opposite to the first direction such that the trailing end of the sheet is located upstream of the detection position with respect to the first direction.

4. The apparatus according to claim 1, further comprising a notification unit configured to, notify a user to pull the sheet in a state in which the sheet is held by the conveyance unit.

5. The apparatus according to claim 1, wherein
the discharging process is a process of restarting the conveyance of the sheet by the conveyance unit.

6. The apparatus according to claim 1, wherein
the discharging process is a process of releasing hold of the sheet by the conveyance unit.

7. The apparatus according to claim 1, wherein
the first rotating member and the second rotating member are provided upstream of the printing unit with respect to the first direction.

8. The apparatus according to claim 1, wherein
the first rotating member and the second rotating member are provided on a downstream side of the printing unit with respect to the first direction of the conveyance unit.

9. The apparatus according to claim 1, wherein the control unit notifies a user to pull the sheet in the state in which the sheet is held by the conveyance unit.

10. A control method of a printing apparatus that comprises a printing unit configured to perform printing on a sheet, a conveyance unit including a first rotating member and a second rotating member that nip and convey the sheet in a first direction, and a detection unit configured to detect a rotation of the first rotating member, the method comprising:
holding the sheet, after completion of printing by the printing unit, by temporarily stopping conveyance by the conveyance unit before completion of discharge of the sheet; and
causing, in a case in which the detection unit detects rotation of the first rotating member in a state in which the sheet is held by the conveyance unit, the conveyance unit to perform a discharging process of the sheet.

11. The method according to claim 10, further comprising notifying a user to pull the sheet in a state in which the sheet is held by the conveyance unit.

12. The method according to claim 10, wherein the discharging process is a process of restarting the conveyance of the sheet by the conveyance unit.

13. The method according to claim 10, wherein the discharging process is a process of releasing hold of the sheet by the conveyance unit.

14. A non-transitory computer-readable storage medium storing a program for causing a computer to perform a control method of a printing apparatus that comprises a printing unit configured to perform printing on a sheet, a conveyance unit including a first rotating member and a second rotating member that nip and convey the sheet in a first direction, and a detection unit configured to detect a rotation of the first rotating member, the method comprising:
holding the sheet, after completion of printing by the printing unit, by temporarily stopping conveyance by the conveyance unit before completion of discharge of the sheet; and
causing, in a case in which the detection unit detects rotation of the first rotating member in a state in which the sheet is held by the conveyance unit, the conveyance unit to perform a discharging process of the sheet.

* * * * *